July 23, 1968  C. W. MacMILLAN  3,393,455
WHEEL ALINEMENT APPARATUS
Filed March 10, 1966  3 Sheets-Sheet 1
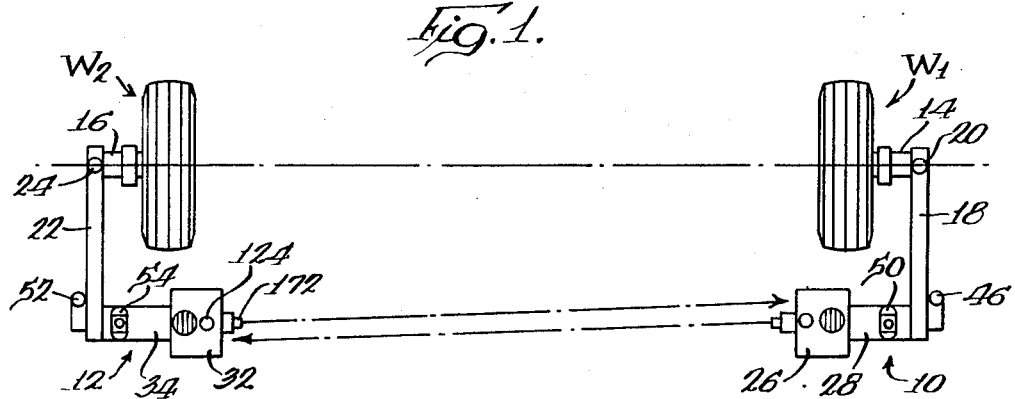
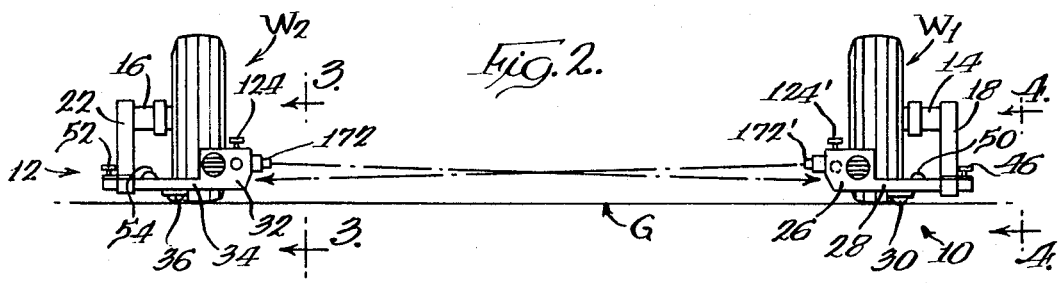
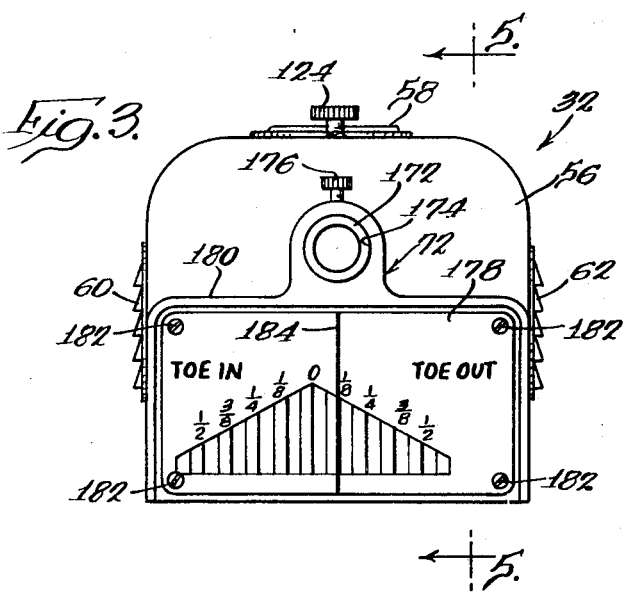
Inventor:
Charles W. MacMillan
By
Gary, Parker, Juettner & Cullinan
Att'ys

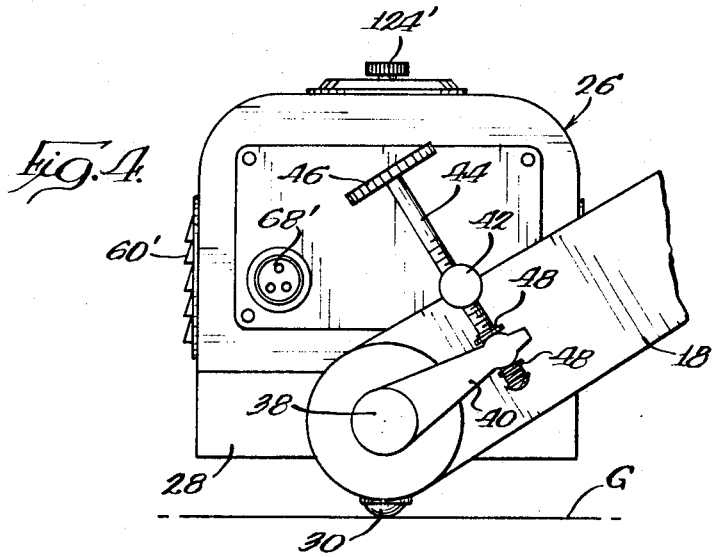
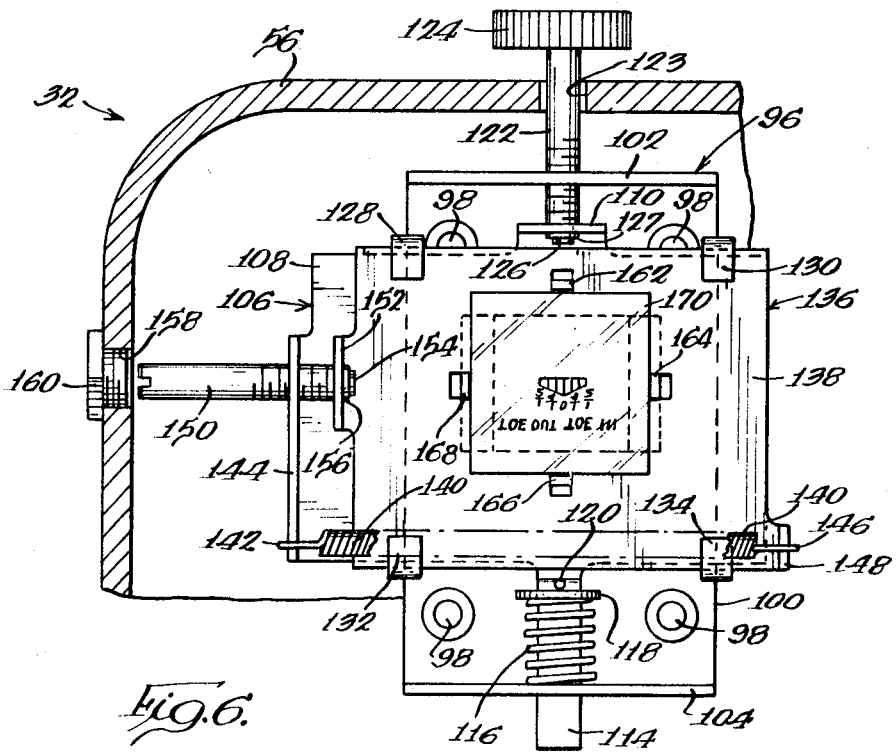

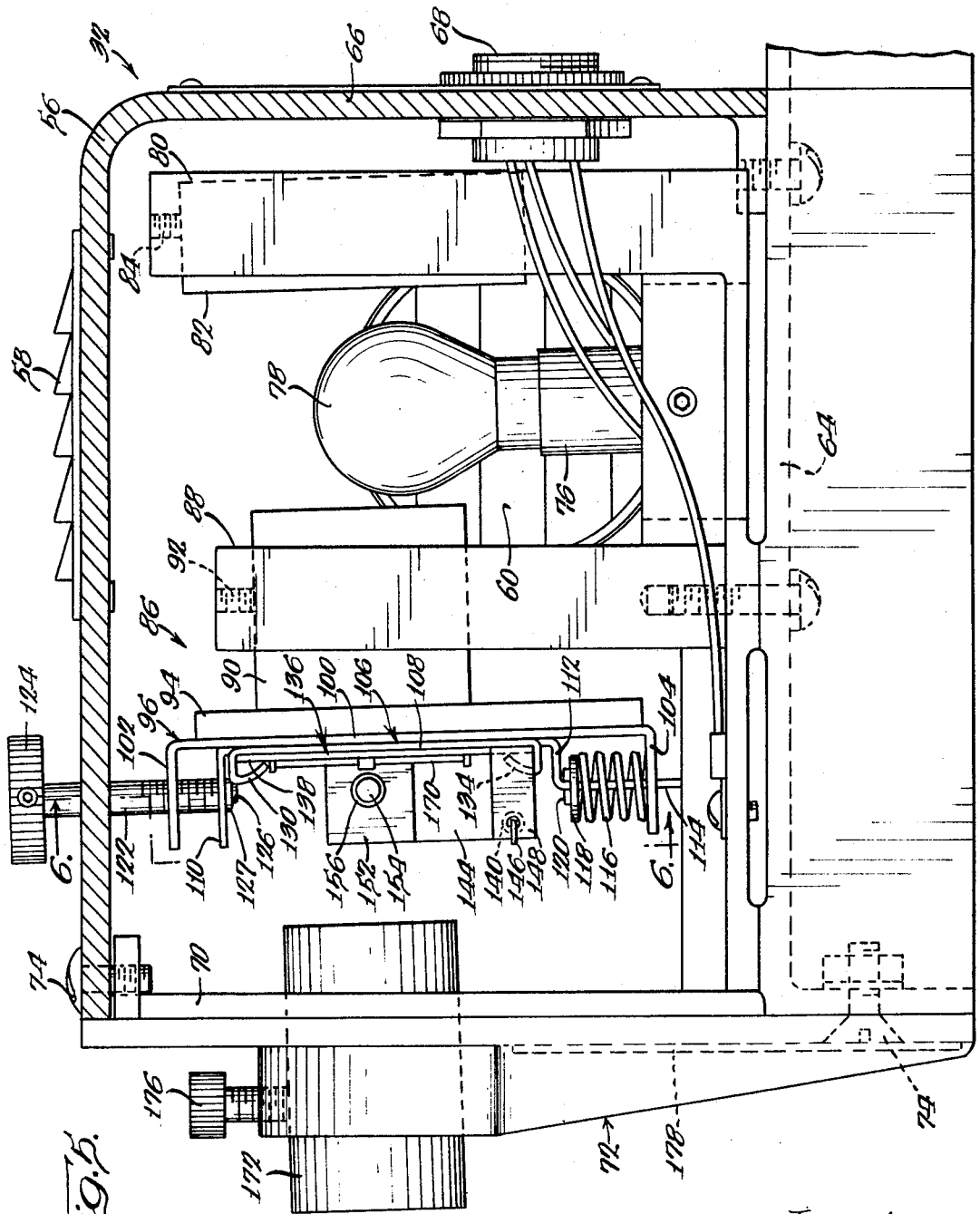

United States Patent Office 3,393,455
Patented July 23, 1968

3,393,455
WHEEL ALINEMENT APPARATUS
Charles W. MacMillan, Rock Island, Ill., assignor to Bear Manufacturing Company, Rock Island, Ill., a corporation of Delaware
Filed Mar. 10, 1966, Ser. No. 533,136
14 Claims. (Cl. 33—46)

ABSTRACT OF THE DISCLOSURE

Apparatus for measuring the toe of the steering wheels of motor vehicles including a pair of light beam projectors and a pair of corresponding screen members with one projector and adjacent screen being mounted from one of the vehicle front wheels and the other projector and screen being mounted from the other vehicle front wheel and the projectors being arranged to face one another so that each will project an image on the screen adjacent the opposite projector, each screen having reference means to indicate the location of the image thereon so as to permit reading the toe of the vehicle wheels.

---

The present invention relates to apparatus for measuring the toe of the steering wheels of motor vehicles, especially the front wheels of automobiles and trucks. More specifically, the invention relates to apparatus which utilizes a projected beam of light and a corresponding screen member to measure the toe-in or toe-out of such vehicle wheels.

The object of the present invention is to provide a toe measuring device which provides extremely accurate measurements and yet is relatively simple to attach to the steering wheels of a vehicle and can be read by an operator very quickly and without need for interchanging components from one wheel to the other.

Other objects and advantages of the invention will be apparent from the following description thereof.

Now, in order to acquaint those skilled in the art with the manner of making and using my invention, I shall describe, in conjunction with the accompanying drawings, the best mode contemplated by me of carrying out the invention.

In the drawings:

FIGURE 1 is a top plan view showing the toe measuring apparatus of the present invention mounted on the front wheels of a vehicle, there being one device mounted on each of the front wheels for cooperation with one another;

FIGURE 2 is a front elevational view of the toe measuring apparatus of FIGURE 1;

FIGURE 3 is an enlarged side elevational view, looking approximately in the direction of the arrows 3—3 of FIGURE 2, showing a combination projector and screen member which is mounted on the right front vehicle wheel;

FIGURE 4 is an enlarged fragmentary side elevational view, looking approximately in the direction of the arrows 4—4 of FIGURE 2, showing the manner in which a combination projector and screen device is adjustably carried in a pivotal manner on one end of a diagonal arm which has its other end mounted on a wheel adapter spindle;

FIGURE 5 is a substantially enlarged vertical sectional view, partly in elevation, taken substantially along the line 5—5 of FIGURE 3, showing the combination projector and screen device of the present invention; and FIGURE 6 is a fragmentary vertical sectional view, partly in elevation, taken substantially along the line 6—6 of FIGURE 5, showing a reticle slide assembly which comprises one component of the projecting device of the present invention.

Referring now to the drawings, FIGURES 1 and 2 show the manner in which a pair of toe measuring assemblies 10 and 12 are attached to left front and right front vehicle wheels $W_1$ and $W_2$ respectively for measuring the toe thereof. As is known in the art, the toe measuring assemblies 10 and 12 are preferably mounted on spindles which constitute true extensions of the respective wheel spindles. In the embodiment illustrated such mounting is accomplished by adapters 14 and 16 each of which attaches magnetically to the accurately machined outer end surface of one of the wheel hubs and which provides an adapter spindle constituting an accurate extension of the wheel spindle. Consequently, the toe measuring assembly 10 includes a diagonal arm 18 having a bore (not shown) in one end which receives the spindle (not shown) of the magnetic adapter 14 and is releasably secured thereto by means of a locking screw having a knob 20. In a similar manner, the toe measuring assembly 12 includes a diagonal arm 22 having a bore (not shown) in one end which receives the spindle (not shown) of the magnetic adapter 16 and is releasably secured thereto by means of a locking screw having a knob 24.

In the foregoing manner, the toe measuring assemblies 10 and 12 are mounted so that the diagonal arms 18 and 22 are exactly perpendicular to the wheel spindles for the wheels $W_1$ and $W_2$ respectively. A magnetic adapter which may be used to advantage for mounting the toe measuring assemblies of the present invention is described in my co-pending application Ser. No. 454,777, filed Aug. 11, 1965, and assigned to the assignee of the present invention. However, it should be understood that various other mounting means may be utilized for mounting the diagonal arms 18 and 22 from the vehicle wheels $W_1$ and $W_2$, and if desired, conventional wheel clamps may be utilized which clamp on the wheel rim and provide a shaft or spindle to which the arms 18 and 22 may be releasably attached.

The toe measuring assembly 10 comprises a combination projector and screen member 26 including a horizontal arm 28 having a ball caster or the like 30 mounted at the underside thereof for engagement with the ground or alinement rack runway G (see FIGURE 2) on which the vehicle wheels $W_1$ and $W_2$ are situated. In a similar manner, the toe measuring assembly 12 comprises a combination projector and screen member 32 including a horizontal arm 34 having a supporting ball caster or the like 36 at its underside for engagement with the ground or runway G. It will thus be understood that the diagonal arm 18 extends forwardly and downwardly toward the ground or runway G, and the projector and screen member 26 is disposed so that the ball caster 30 rests on the ground or runway G regardless of the size of the wheel $W_1$. The angle of inclination of the diagonal arm 18 will depend upon the height of the wheel spindle, which will of course vary in accordance with the size of the wheel. However, adjustable pivot means is provided for controlling the orientation of the projector and screen member 26 relative to the diagonal arm 18 as will be described hereinbelow in conjunction with FIGURE 4.

Referring now to FIGURE 4, a stud 38 is fixed to the end of the horizontal arm 28 so as to extend axially outwardly therefrom, and a lever or crank 40 is fixed relative to the stud 38 so as to extend radially therefrom. The diagonal arm 18 has a pivot member 42 pivotally secured thereto, and an adjusting screw 44 having a control knob 46 is threaded through the pivot 42 and has a pair of washers 48 thereon between which is held the radially outer end of the lever or crank 40. Consequently, when the adjusting screw 44 is manually rotated in one direction it effects movement of the lever 40 in a clockwise direction as viewed in FIGURE 4 relative to the diagonal arm 18, and when the screw 44 is rotated in the opposite direction it effects movement of the lever 40 in a counterclockwise direction relative to the arm 18. Moreover, when the lever 40 is rotated about the axis of the stud 38 relative to the diagonal arm 18 as described above, the lever carries with it the stud 38, the horizontal arm 28 and the combination projector and screen member 26.

A level assembly 50 having the usual bubble vial and associated scale is mounted transversely on the top of the horizontal arm 28 (see FIGURES 1 and 2) for indicating whether the arm is level relative to its rotational orientation about the longitudinal axis of the pivot stud 38, and the adjusting screw 44 is rotated until such a level condition is effected. It will thus be understood that the angle of inclination of the diagonal arm 18 will vary in accordance with the height of the spindle of the wheel $W_1$, but regardless of such inclination the assembly of the projector and screen member 26 and horizontal arm 28 will be supported with the ball caster 30 resting on the ground or alinement rack runway G, and the orientation of such assembly is adjustable by rotating the knob 46 in an appropriate direction and thereby pivoting the foregoing assembly about the axis of the pivot stud 38 until the assembly is level as indicated by the level member 50. The toe measuring assembly 12 is mounted and adjusted in a manner substantially identical to that described above for the toe measuring assembly 10 and includes an adjusting screw having a knob 52 and a level assembly 54 mounted on the top of the horizontal arm 34.

Reference is now made to FIGURES 3 and 5 which illustrate the combination projector and screen member 32. However, it will first be noted that the opposite member 26 is identical to the member 32 except that it is mounted on a different side of its diagonal arm so as to face the unit 32, and except for the fact that the reticle is reversed as will be pointed out hereinafter. Accordingly, the member 26 will not be described in detail, and primed reference numerals will be used to identify components thereof which correspond with components of the member 32 to be described herein. The member 32 includes a housing 56 having top louvers 58 and side louvers at 60 and 62, and there is provided a base 64 on which various components to be contained within the housing are mounted. The housing further comprises a rear wall 66 in which an electrical socket 68 is mounted, and a forward wall 70 on the front of which a bracket 72 is secured by screws 74 or the like. A lamp socket 76 containing a lamp 78 is mounted within the housing 56 in an upright position, and behind the lamp or rearwardly thereof there is mounted a reflector holder 80 having a reflector 82 held therein in a desired position by a set screw or the like 84.

A condenser lens and reticle assembly 86 is mounted forwardly of the lamp 78 and such assembly includes an upright mounting member 88 in which a condenser lens 90 is mounted and held by a set screw or the like 92. At the forward end of the condenser lens 90 there is a mounting member 94 to which a U-shaped mounting bracket 96 is firmly attached by means of four mounting screws 98 (see FIGURE 6). The mounting bracket 96 comprises a vertically disposed base 100 which is bent at its upper end to form an upper horizontal leg 102 and is also bent at its lower end to form a lower horizontal leg 104. FIGURES 5 and 6 show a vertically movable slide 106 comprising a vertically disposed base 108 which is bent at its upper end to form an upper horizontal leg 110 and is bent at its lower end to form a horizontal leg portion 112 and a downwardly extending vertical leg portion 114.

A compression spring 116 is positioned so as to encompass the vertical leg portion 114 of the slide 106 with the lower end of the spring seated against the lower horizontal leg 104 of the mounting bracket 96. The upper end of the spring 116 bears against a retaining washer 118 which is held against upward movement relative to the leg portion 114 by a roll pin 120 mounted transversely in the upper end of the leg. Accordingly, the spring 116 acts to yieldingly urge the vertically movable slide 106 upwardly, and the position of the slide is controlled by an adjusting screw 122. The screw 122 extends through an opening 123 in the top of the housing 56 and is threaded in to the upper horizontal leg 102 of the mounting bracket 96. The upper end of the adjusting screw 122 has a manual control knob 124 mounted thereon, while the lower end of the screw engages against the upper horizontal leg 110 of the vertical slide 106. It will thus be seen that rotation of the control knob 124 will provide adjustment of the vertical position of the slide 106. The lower end of the adjusting screw 122 has a reduced diameter projection 126 thereon which extends through the slide leg 110 and thus serves to retain and guide the upper end of the slide 106, there being a spring retainer 127 mounted on the projection 126 for maintaining the screw in a desired position. The vertical leg portion 114 at the lower end of the slide 106 projects downwardly through a slot in the lower horizontal leg 104 of the bracket 96 so as to guide the lower end of the slide.

The vertical slide 106 is formed with four bent tabs 128, 130, 132 and 134 for retaining a horizontally movable slide member 136 while providing a sliding fit therebetween. The horizontal slide 136 comprises a flat vertically disposed base 138 positioned against the front of the slide 106 and retained by the two upper tabs 128 and 130 which are bent downwardly over the upper edge of the slide 136 and the two lower tabs 132 and 134 which are bent upwardly over the lower edge of the slide 136. However the slide 136 is free to move horizontally relative to the slide 106 and is yieldingly urged toward the left as viewed in FIGURE 6 by a tension spring 140 having one end 142 anchored to a leg portion 144 of the vertical slide 106 and having its other end 146 anchored to a bent tab 148 formed on the horizontal slide 136. A horizontal adjusting screw 150 is threaded through the leg portion 144 of the vertical slide 106 and the end thereof engages a bent tab or leg 152 formed on the horizontal slide 136. A reduced diameter projection 154 is provided on the end of the screw 150 so as to extend through an opening in the tab 152, and a retaining spring 156 serves to hold the screw in any position to which it is rotated. An opening 158 is formed in the housing 56 opposite the outer slotted end of the screw 150 whereby upon removal of a plug 160 an operator may insert a screwdriver into the housing to adjust the screw. It will be understood that rotation of the screw 150 in one direction will move the horizontal slide 136 to the right as viewed in FIGURE 6, while rotation in the opposite direction will effect movement of the slide to the left.

The horizontal slide 136 is provided on its front face with four lugs or tabs 162, 164, 166 and 168 to assist in locating a reticle member 170. In the embodiment being described the reticle 170 is approximately square and has an image formed near the center thereof. The reticle 170 is located between the four lugs as shown in FIGURE 6 and is then cemented in place against the front of the slide 136. At the front of the housing 56 an objective lens assembly 172 is mounted in an opening 174 (see FIGURE 3) formed in the mounting bracket 72 and is adjustably held therein by a locking screw 176 which is releasable in order to permit focusing of the lens assembly. In addition, a screen 178 is mounted at the front of the bracket 72 in an area defined by a projecting rim or border 180 and is secured in position by four fastening screws or the like 182.

The only marking formed on the screen 178 comprises a vertical reference or indicator line 184 and it will be understood that the image shown on the screen 178 in FIGURE 3 comprises a projected view of an image formed on the reticle 170' of the oppositely disposed projecting member 26. That is, a projected view of the reticle 170' in the projector 26 will appear on the screen 178 of the opposite projector-screen member 32, such projected view being upside down and reversed from left to right with respect to the image formed on the reticle. Such image comprises a generally triangular border having a plurality of spaced vertical toe lines therein with indications reading from one-half inch toe-in to one-half inch toe-out and with the vertical lines spaced in toe increments of 1/16 inch. It should be noted that the combination projector and screen member 26 is identical to the member 32 described hereinabove except that the reticle for the unit 26 has the "toe-in" and "toe-out" indications reversed as compared to the reticle 170 for the unit 32.

In operation, the toe measuring assembly 10 is mounted from the left front vehicle wheel $W_1$ by attaching the magnetic adapter 14 to the machined end surface of the wheel hub, or if desired a wheel clamp may be attached to the rim of the wheel, and then the diagonal arm 18 is mounted over the adapter spindle and the projector 26 is positioned forwardly of the wheel with the ball caster 30 supported on the ground or alinement rack runway G. The knob 46 is turned so as to rotationally adjust the projector 26 and horizontal arm 28 about the axis of the pivot shaft 38 as shown in FIGURE 4 until the bubble of the level assembly 50 indicates that the projector is level. The purpose of the latter adjustment is to assure that the image which the projector 26 projects on the screen 178 of the oppositely disposed projector 32 will be properly oriented as shown in FIGURE 3 with the vertical toe increment lines of the image parallel to the vertical reference line 184 on the screen regardless of the height of the wheel spindle and the inclination of the diagonal arm 18. The knob 20 is also turned to tighten a locking screw and thereby firmly connect the diagonal arm 18 with the spindle of the magnetic adapter 14. The other toe measuring assembly 12 is then mounted in substantially the same manner in conjunction with the front right vehicle wheel $W_2$ so that the projector 26 will project an image on the screen 178 of the opposite projector member 32 while the projector 32 will project a similar image on the screen 178' of the first member 26.

It will be seen from FIGURE 3 that the screen 178 is located on the front of the device 32 within a border 180 so as to be disposed beneath the objective lens assembly 172. Because of the camber of the wheels $W_1$ and $W_2$, it may be necessary to adjust the vertical position of the reticle in each of the projectors 26 and 32 in order to locate the projected view of the reticle in the proper vertical position on the opposite screen member. Accordingly, such adjustment is effected by rotation of the vertical adjusting screw 124 (see FIGURES 5 and 6) which moves the reticle slide 106 vertically and thereby adjusts the vertical position of the reticle 170. When the two toe measuring assemblies 10 and 12 have been mounted as shown in FIGURES 1 and 2, and after the reticles 170 and 170' have been vertically adjusted to offset camber and project an image on the screens 178 and 178', the toe reading may be taken.

As can be seen from FIGURE 3, a reading is taken at the vertical reference line 184–184' which is formed on each of the screens 178–178' and each reading will be either a toe-in or a toe-out reading depending upon which direction the image is displaced laterally relative to the reference line. Readings are thus taken on the two screens and then added algebraically to obtain the total toe for the vehicle wheels. In the alternative, the wheels $W_1$ and $W_2$ may be turned until the vertical zero line of the image projected on one of the screens 178 coincides with the respective reference line 184 so as to indicate a zero toe reading, and then the total toe for the two wheels may be read on the opposite screen. Thereafter, the total toe may be split equally between the two wheels, as revealed by the readings on the two screens, by appropriate turning of the wheels, thereby to set the wheels in straight ahead steering position and facilitate other tests and alinement procedures.

If desired, the projectors 26 and 32 may be positioned rearwardly of the front wheels rather than forwardly thereof. Thus, the diagonal arm 18 may be mounted on an adapter spindle attached to the right front wheel $W_2$ and the diagonal arm 22 may be mounted on an adapter spindle attached to the left front wheel $W_1$ so as to locate the projectors behind such wheels. However, when the units are interchanged from one side to the other it is necessary to interchange the reticle members 170 and 170'.

It should be understood that the projectors 26 and 32 must be calibrated to assure that the toe readings are accurate. In order to effect such calibration the two toe measuring assemblies 10 and 12 may be mounted on a straight shaft or spindle with the diagonal arm 18 mounted on one end of the shaft and with the diagonal arm 22 mounted on the other end, thereby simulating a zero toe condition. Then the projector 32 is adjusted by removing the plug 160 from the opening 158 and inserting a screw driver into the housing so as to rotate the horizontal adjusting screw 150 (see FIGURE 6). In this manner the reticle slide 136 is adjusted horizontally until the image projected on the opposite screen 178' is disposed so that the zero toe line coincides with the vertical reference line 184' thereby indicating zero toe. The opposite projector 26 is then adjusted in the same manner so that both of the screens indicate a zero toe reading, after which the toe measuring assemblies 10 and 12 are ready for use.

When the projectors 26 and 32 have been calibrated through horizontal adjustment of the reticles, the plug 160 is replaced in the opening 158 in each device since such adjustment is required only infrequently. On the other hand, the vertical adjustment screw is provided with the projecting knob 124 since in checking any vehicle it may be necessary to adjust the reticles 170 and 170' vertically to offset the camber of the vehicle wheels.

The wheel alinement apparatus of the present invention permits accurate toe determinations to be made with a minimum of time and effort on the part of an operator. The two-way adjustability of the reticle 170 is quite advantageous since the horizontal slide adjustment facilitates calibration of the device for accurate toe readings while the vertical slide adjustment provides a simple procedure for offsetting the camber of the vehicle wheels. Moreover, it is possible to determine the toe of the vehicle wheels without any need for interchanging components from one side to the other as is common with toe measuring devices heretofore known. It will also be noted that because the diagonal arms 18 and 22 are designed to fit over a spindle or shaft, the toe measuring assemblies of the present invention are adaptable for use with various types of mounting or attaching means. That is, either a wheel clamp which attaches to the rim of a wheel, or a magnetic adapter which attaches to the machined end of a wheel hub, may be used. In either case the attaching or mounting member will have a spindle which constitutes an extension of the wheel spindle, and the arms 18 and 22 may be mounted thereon.

Moreover, the toe measuring devices described herein are independent of any caster-camber gauges, and yet the spindle of each wheel clamp or magnetic adapter may be made long enough so that a caster-camber gauge can be mounted thereon outwardly of each of the diagonal arms 18 and 22. It should further be noted that the pivotal adjustment between the projectors 26 and 32 and the diagonal arms 18 and 22 which is afforded by the adjustable screw 44 and related structure shown in FIGURE 4 permits the projectors to be disposed close to the ground or alignment rack runway G as shown in FIGURE 2 regardless of the height of the wheel spindles and thereby assures adequate clearance between the projectors and the underside of the vehicle. For example, if a rigid connection were provided between the projector 26 and the diagonal arm 18, then in order to maintain the projector oriented in an upright position it would have to be supported a greater distance from the ground